United States Patent
Kern et al.

(10) Patent No.: US 10,447,485 B2
(45) Date of Patent: Oct. 15, 2019

(54) DETERMINING TRUSTWORTHINESS OF A CRYPTOGRAPHIC CERTIFICATE

(71) Applicant: International Business Machines Corporation, Armonk, NY (US)

(72) Inventors: David S. Kern, Billerica, MA (US); Juan G. Lara, Dublin (IE); Mark A. McGloin, Dublin (IE); Olgierd S. Pieczul, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 14/933,920

(22) Filed: Nov. 5, 2015

(65) Prior Publication Data

US 2017/0134173 A1    May 11, 2017

(51) Int. Cl.
*H04L 9/32* (2006.01)

(52) U.S. Cl.
CPC ........ *H04L 9/3268* (2013.01); *H04L 2209/76* (2013.01)

(58) Field of Classification Search
CPC ............. H04L 63/0823; H04L 63/3268; H04L 2209/76; H04L 9/3268; H04L 9/321
See application file for complete search history.

(56) References Cited

U.S. PATENT DOCUMENTS

| | | |
|---|---|---|
| 7,437,551 B2 | 10/2008 | Chan et al. |
| 8,438,628 B2 | 5/2013 | Shah et al. |
| 9,077,546 B1 * | 7/2015 | Rakshit .................. H04L 9/3265 |
| 2005/0021969 A1 * | 1/2005 | Williams .............. H04L 9/3268 713/176 |
| 2005/0278534 A1 * | 12/2005 | Nadalin ................ H04L 9/3263 713/175 |
| 2007/0245414 A1 * | 10/2007 | Chan ................... H04L 63/0823 726/12 |
| 2009/0037997 A1 * | 2/2009 | Agbabian ........... H04L 63/1416 726/10 |
| 2009/0164776 A1 * | 6/2009 | Tuoriniemi ............. G06F 21/10 713/158 |
| 2010/0275024 A1 | 10/2010 | Abdulhayoglu |
| 2012/0079584 A1 * | 3/2012 | Niemela ............. H04L 63/0823 726/10 |
| 2014/0040611 A1 * | 2/2014 | Tenenboym .......... H04L 9/3236 713/157 |

(Continued)

OTHER PUBLICATIONS

Constrained Environments, Bergmann et al. (Year: 2014).*

(Continued)

*Primary Examiner* — Alexander Lagor
*Assistant Examiner* — Vu V Tran
(74) *Attorney, Agent, or Firm* — L. Jeffrey Kelly (57) ABSTRACT

Embodiments of the present invention include determining whether a cryptographic certificate can be trusted. A cryptographic certificate is received at a client device. The client device performs a first check on a first set of attributes of the cryptographic certificate. In addition, the client device sends the cryptographic certificate to a central verification server, which performs a second check on a second set of attributes of the cryptographic certificate. In the case that the first set of attributes passes the first check, and the second set of attributes passes the second check, the client device determines that the cryptographic certificate can be trusted.

25 Claims, 6 Drawing Sheets

(56) References Cited

U.S. PATENT DOCUMENTS

| | | | |
|---|---|---|---|
| 2014/0195800 A1 | 7/2014 | Sabin et al. | |
| 2014/0237582 A1* | 8/2014 | Niemela | H04L 63/0823 |
| | | | 726/10 |
| 2014/0359281 A1* | 12/2014 | Saboori | H04L 63/0823 |
| | | | 713/156 |
| 2017/0005805 A1* | 1/2017 | Wang | H04L 9/3263 |

OTHER PUBLICATIONS

Mell et al., "The NIST Definition of Cloud Computing", National Institute of Standards and Technology, Special Publication 800-145, Sep. 2011, pp. 1-7.

http://en.wikipedia.org/wik/X.509, "X.509", printed Sep. 30, 2015, pp. 1-13.

Karamanian et al., "PKI Processes and Procedures", Apr. 1, 2011, ciscopress.com, pp. 1-15.

* cited by examiner

DETERMINING TRUSTWORTHINESS OF A CRYPTOGRAPHIC CERTIFICATE

BACKGROUND

The present invention relates generally to the field of computing, and more particularly to a cryptographic certificate used in a public key infrastructure.

Security failures for transmitting information over a network, such as the Internet, have limited users' willingness to transmit information over networks. Security flaws in existing systems are well documented, and security which is transparent to companies and the public has been difficult to implement. Some encryption algorithms can be broken if enough resources are implemented. However, if resources needed to decrypt a certificate outweigh a potential reward, a person may choose not to attempt to break the encryption.

SUMMARY

In accordance with a first aspect of the invention there is provided a computer-implemented method of determining whether a cryptographic certificate can be trusted. The method may comprise receiving a pre-checked cryptographic certificate from a client device. The pre-check comprises a first check on a first set of attributes of the cryptographic certificate. The method may comprise performing a second check on a second set of attributes of the pre-checked cryptographic certificate. In response to the second set of attributes passing the second check, the method may comprise sending a notification to the client device that the second set of attributes passes the second check.

In accordance with a second aspect of the invention there is provided a client device determining whether a cryptographic certificate can be trusted. The client device may perform a first check on a first set of attributes of the cryptographic certificate. The client device may send the cryptographic certificate to a central verification server. The client device may receive a notification from the central verification server indicating if a second set of attributes of the cryptographic certificate passes a second check. In response to the first set of attributes passing the first check, and the notification from the central verification server indicates that the second set of attributes passed the second check, the client device may determine that the cryptographic certificate can be trusted.

In accordance with a third aspect of the invention there may be provided a central verification server to facilitate a client device in determining whether a cryptographic certificate can be trusted. The central verification server may receive the cryptographic certificate from the client device. The central verification server may perform a check on a set of attributes of the cryptographic certificate. In response to the set of attributes passing the check, the central verification server may send a notification to the client device that the set of attributes passed the check.

In accordance with a fourth aspect of the invention there may be provided a computer program product for determining whether a cryptographic certificate can be trusted. The computer program product may include a computer-readable storage medium having computer-readable program code embodied therewith. The computer-readable storage medium may not be a transitory signal per se. The computer-readable program code may be executed on a computer system to enable a client device to perform a method. The method may include performing a first check on a first set of attributes of the cryptographic certificate. The method may include sending the cryptographic certificate to a central verification server. The method may include receiving a notification from the central verification server whether a second set of attributes of the cryptographic certificate passes a second check. In response to the first set of attributes passing the first check, the notification from the central verification server may indicate that the second set of attributes passed the second check. The method may include determining that the cryptographic certificate can be trusted.

In accordance with a fifth aspect of the invention there may be provided a computer program product for facilitating a client device determining whether a cryptographic certificate can be trusted. The computer program product may include a computer-readable storage medium having computer-readable program code embodied therewith. The computer-readable storage medium may not be a transitory signal per se. The computer-readable program code may be executed on a computer system to enable a central verification server to perform a method. The method may include receiving the cryptographic certificate from the client device. The method may include performing a check on a set of attributes of the cryptographic certificate. In response to the set of attributes passing the check, the method may include sending a notification to the client device that the set of attributes passed the check.

It will of course be appreciated that feature values described in relation to one aspect of the present invention may be incorporated into other aspects of the present invention. For example, the method of the invention may incorporate any of the feature values described with reference to the computer system of the invention and vice versa.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
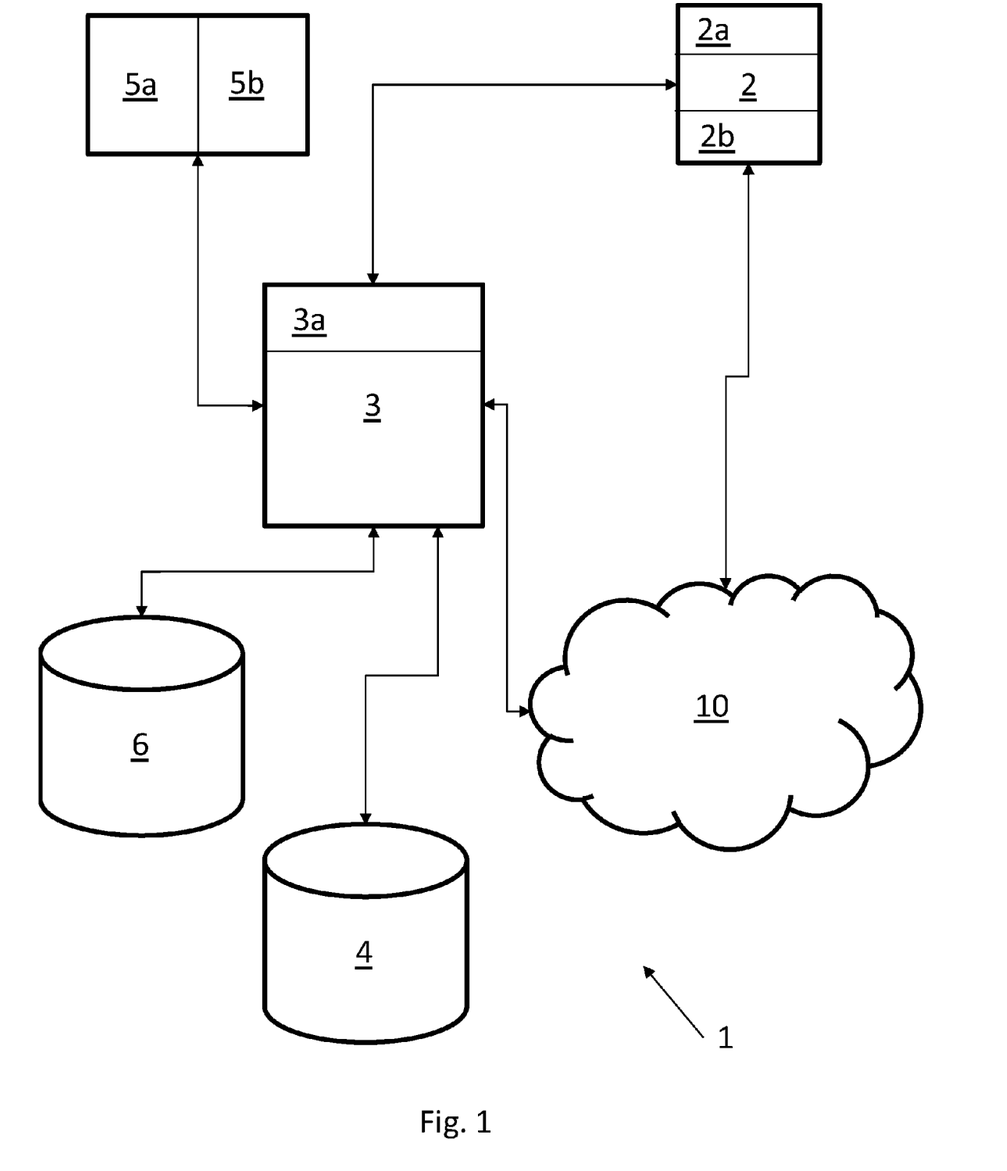
FIG. 1 is a schematic diagram of a computer system comprising a client device and central verification server, in accordance with an embodiment of the present invention.

A computer system in accordance with an embodiment of the invention is shown in FIG. 1. The computer system 1 comprises a client device 2, which may for example be a personal computer (PC), laptop or mobile device. The client device has a processor 2a and memory 2b.

The client device 2 is in communication with a central verification server 3. The central verification server 3 has a processor 3a, and also a certificate revocation list (CRL) store 4, a whitelist 5a and blacklist 5b, and an attribute store 6, as described in more detail below.

The client device 2 and central verification server 3 are in communication with the Internet 10.

Figure 2:
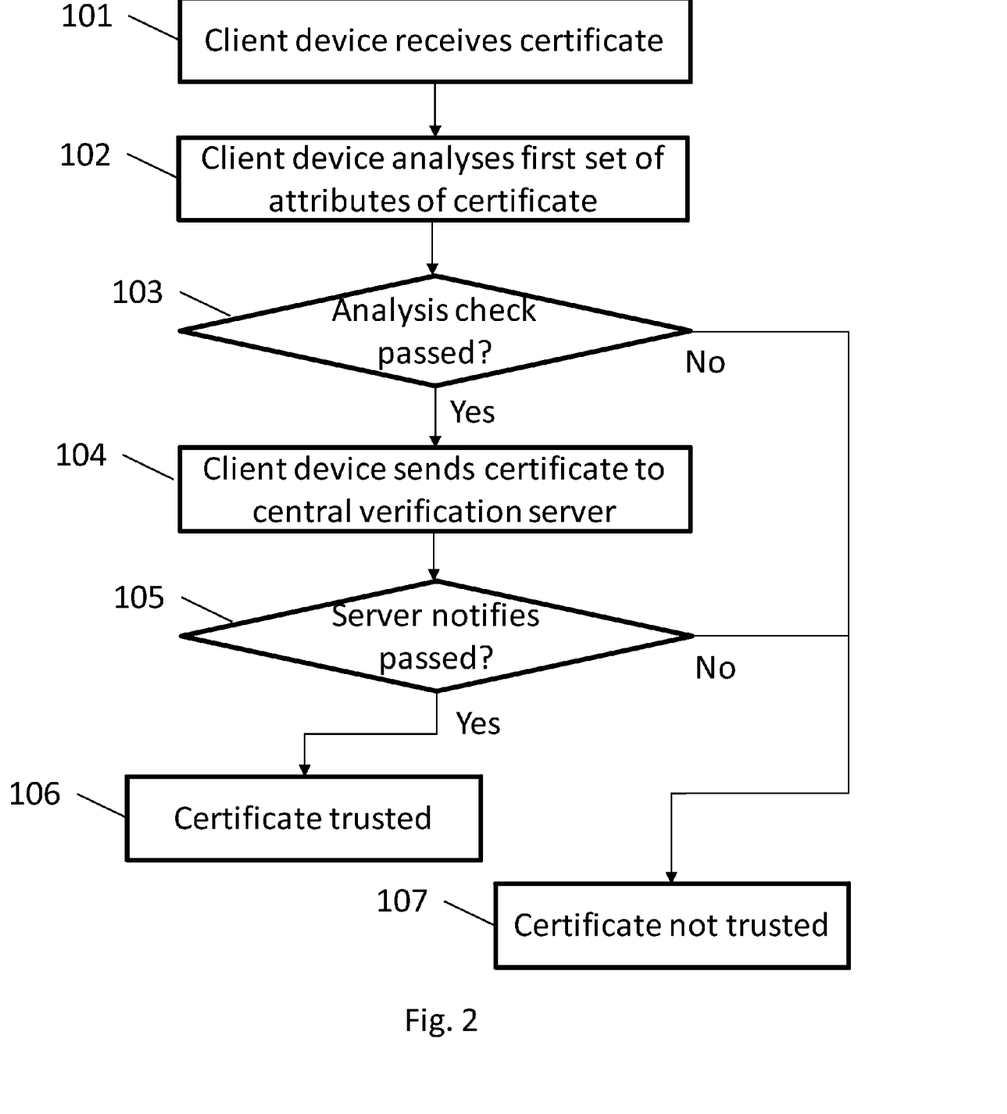
FIG. 2 is a flowchart showing the operation of the client device of FIG. 1, in accordance with an embodiment of the present invention.

The operation of the client device 2 when verifying a cryptographic certificate is now described with reference to the flowchart of FIG. 2.

First, the client device 2 receives a certificate which it wishes to verify (step 101). Such a certificate will usually be received via the Internet 10, during communication with an external resource. The client device 2 stores the certificate in its memory 2b, and using its processor 2a analyses a first set of attributes of the certificate (step 102). For example, the client device 2 may verify the cryptographic signature of the certificate, and that it is suitable for the purpose for which it has been obtained (e.g. it is indeed a certificate for the resource it is intended to be used to validate).

The client device 2 then checks if the analysis of the first set of attributes was successful (step 103), i.e. if they indicate that the certificate can be trusted. If not, for example if the cryptographic signature of the certificate cannot be verified, the client device 2 determines that the certificate cannot be trusted (step 107).

If, on the other hand, the analysis of the first set of attributes was successful, the client device 2 sends the certificate to the central verification server 3 (step 104). As described in more detail below, the central verification server 3 uses its processor 3a to analyze the certificate, and then indicates whether it its own analysis is successful or not (step 105).

If the central verification server 3 indicates that its analysis was not successful, the client device 2 again determines that the certificate cannot be trusted (step 107). If, on the other hand, the central verification server 3 indicates that its analysis was successful, the client device 2 determines that the certificate can be trusted (step 106).

In an alternative embodiment, the client device 2 sends the certificate to the central verification server 3 immediately after receiving it, and only performs its own check on the first set of attributes if the central verification server 3 indicates that its analysis was successful; if the central verification server 3 indicates that its analysis was not successful, the client device simply determines that the certificate cannot be trusted. In another alternative embodiment, the client device 2 sends the certificate to the central verification server 3 in parallel with analyzing the first set of attributes.

Figure 3:
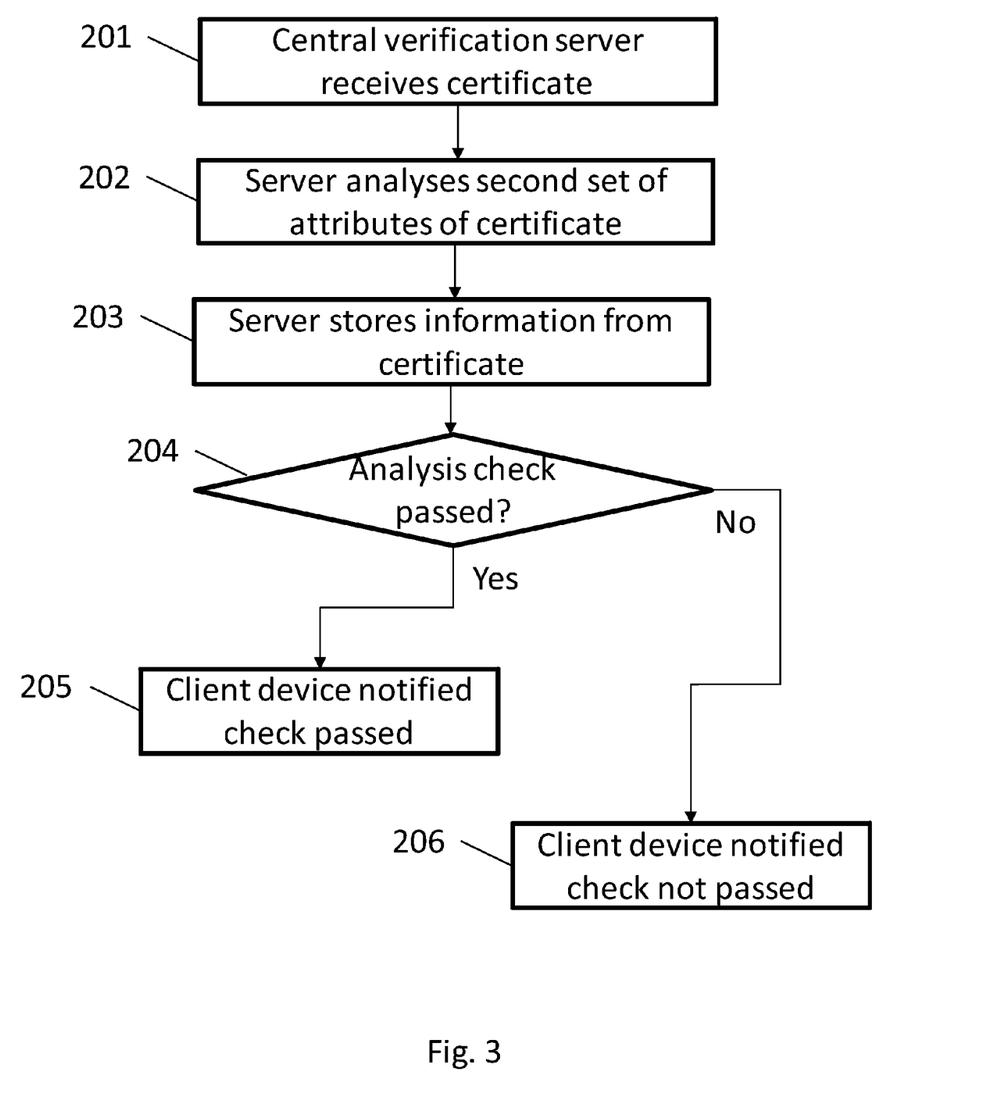
FIG. 3 is a flowchart showing the operation of the central verification server of FIG. 1, in accordance with an embodiment of the present invention.

The operation of the central verification server 3 when analyzing a cryptographic certificate is now described with reference to the flowchart of FIG. 3.

First, the central verification server 3 receives the certificate from the client device 2 (step 201). The central verification server 3 then, using its processor 3a, analyses a second set of attributes of the certificate (step 202), as described in more detail below. The central verification server 3 stores information obtained during the analysis in the attribute store 6 (step 203), again as described in more detail below.

The central verification server 3 then checks if the analysis of the second set of attributes was successful (step 204). If the analysis is successful, the central verification server 3 sends a notification to the client device 2 that the analysis was successful (step 205). If the analysis is not successful, the central verification server 3 sends a notification to the client device 2 that the analysis was not successful (step 206).

The analysis performed by the central verification server 3 on the second set of attributes is now described. The analysis may involve some or all of several aspects. The second set of attributes may include attributes in the first set of attributes, and so the central verification server 3 may perform analysis that is also performed by the client device 2, which may be an identical analysis, or a different or more in-depth analysis on the same attribute, for example.

A first analysis that can be performed by the central verification server 3 is to check if the certificate is present in a CRL, i.e. if it has been invalidated. The central verification server 3 does this using the CRL store 4, in which a CRL provided by a CRL service is cached. By using a cached CRL, this check is much quicker than if the CRL needed to be downloaded, and is not susceptible to a DoS attack on the CRL service. In one embodiment, an updated the CRL is regularly obtained from the CRL service, so that the cached CRL has always been updated within a desired time period. In another embodiment, the age of the cached CRL is checked when the certificate is received, and an updated version is obtained from the CRL service only if it is more than the desired time period since it was last updated.

Another analysis that can be performed by the central verification server 3 is to check if an attribute of the certificate, for example the CA that issued the certificate, is listed in the whitelist 5a. If the CA is listed, the certificate is considered be trustworthy without any other analysis being required. Another very similar analysis that can be performed by the central verification server is to check if an attribute of the certificate (again for example the CA that issued the certificate) is listed in the blacklist 5b, and if so the certificate is considered not to be trustworthy without any other analysis being required. An administrator of the central verification server 3 can update the whitelist 5a and blacklist 5b to add or remove attributes as required.

In a similar manner, an administrator may be able to define policy rules based upon the attributes of the certificate, and in accordance with the policy rules a certificate can be determined to be trustworthy or not. For example, if it is known that a particular CA is no longer issuing certificates, a policy rule could be set to reject any certificate issued by that CA after the present date.

As discussed above, during analysis of a certificate, the central verification server 3 stores information obtained during the analysis in the attribute store 6. In this way, historical information from the previous checking of certificates is obtained. Another analysis that can be performed by the central verification server 3 uses this historical information. For example, the information can be analyzed to determine correlations or other patterns in the data. It may be determined that certificate for a particular resource is always issued by a particular CA. If a certificate is received that is anomalous, for example a certificate is received for the particular resource was issued by a different CA, this may indicate that the certificate has been forged. More complicated correlations may be determined. For example, certificates for domains relating to a particular geographical area may usually be issued by one of a particular set of CAs (i.e. they are positively correlated), or alternatively may very rarely be issued by those CAs (i.e. they are negatively correlated). It will be appreciated that there are many other correlations may be determined in different embodiments of the invention.

It will be appreciated that various different types of analysis, including but not limited to statistical analysis and other types of analysis, could be performed using the information stored in the attribute store 6. The central verification server 3 will be able to perform analyses on the information that would not be appropriate for the client device 2, due to the smaller amount of historical information the client device 2 is able to obtain and the lack of resources the client device 2 is likely to have available. The results of the analysis could be used, alone or together with the results of the other analyses, to determine a score for the certificate, with the certificate being considered trustworthy only if its score falls within a predetermined threshold. The central verification server 3 can also send a notification, for example to an administrator, if its analysis indicates that it appropriate to do so, for example if appears that a security event is occurring.

Another analysis that can be performed by the central verification server 3 is to provide an equivalent to certificate pinning. In particular, the central verification server 3 can remember a validated certificate for a resource, and if any other certificate for that resource is received, it can consider that certificate to fail the analysis. As the central verification service 3 should be managed by an administrator (in contrast to the client device 2), the manual intervention that can be required to manage certificate pinning should not be problematic.

By splitting the job of verification between the client device and the central verification server, the client device can perform simpler and/or less resource-intensive checks, such as verifying the cryptographic signature of the certificate and that it is suitable for the purpose it has been obtained (e.g. it is indeed a certificate for the resource it is intended to be used to validate). This can be particularly advantageous when the client device is a device with limited resources, such as a mobile device.

Meanwhile, the central verification server can perform more complex and/or more resource-intensive tasks, for example checking the certificate against a certificate revocation list (CRL). In particular, CRL lists can be large, especially if a widespread security issue has occurred. As well as increasing transaction time and resource usage, it is possible for a denial-of-service (DoS) attack to be performed by means of attack on the service from which the CRL is obtained. Further, as the central verification server will be providing checks for multiple client devices, it can be beneficial for it to take steps such pre-emptively downloading/caching the CRL list, which would not be beneficial for a client device to do as they verify certificates too infrequently.

Further, under the X.509 model any "trusted" certificate authority (CA) can be used to sign any certificate. If a party is presented with certificate signed by any trusted CA, it considers it valid. This means that if any trusted CA is compromised, then in effect any certificate can be forged. To counter this, certificate "pinning" can be used, whereby a validated certificate for a party is remembered and any other certificates received for that party are rejected. However, this requires manual intervention, for example if a certificate is invalidated and a new one is issued. The use of a central verification server allows an administrator to manage certificate pinning, which would not usually be appropriate for a client device.

It will be appreciated that not all embodiments of the invention will enjoy all of the advantages discussed above, and whether they do so will depend on their particular combination of features.

In different embodiments, the client device may perform the first check, and only send the certificate to the central verification server if the first check is passed. Alternatively, the client device may wait to receive an indication by the central verification server that the second check has been passed before performing the first check. Alternatively again, the client device may perform the first check in parallel with sending the certificate to the central verification server for the second check.

The first and second sets of attributes may overlap, and the client device and central verification server may perform some of the same checks.

Figure 4:
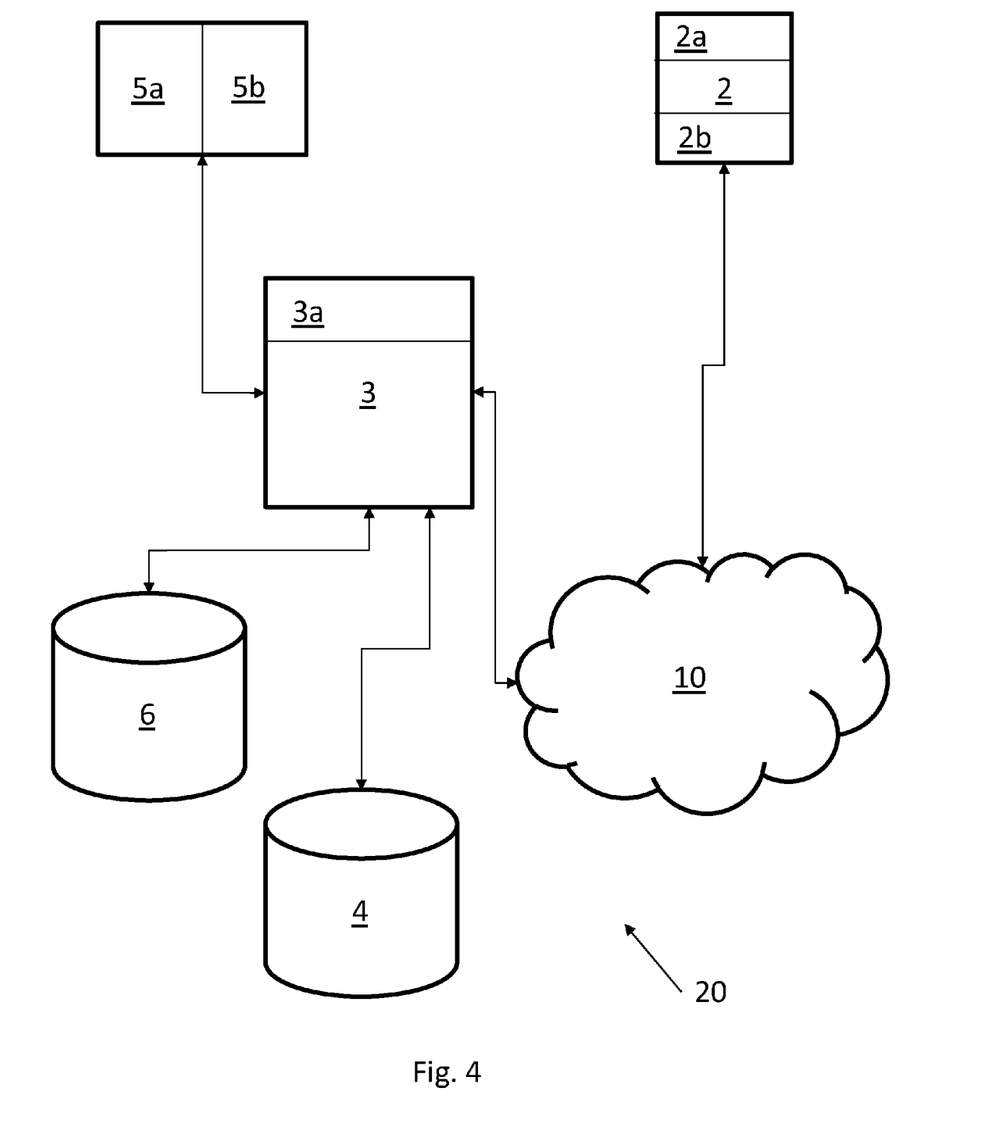
FIG. 4 is a schematic diagram of a computer system comprising a client device and central verification server, in accordance with an embodiment of the present invention.

A computer system in accordance with an alternative embodiment of the invention is shown in FIG. 4. As in the previous embodiment, the computer system 20 comprises a client device 2, and a central verification server 3 which has a CRL store 4, a whitelist 5*a* and blacklist 5*b*, and an attribute store 6. The client device 2 and central verification server 3 are in communication with the Internet 10.

However, in the present embodiment the client device 2 and central verification server 3 are not in direct communication, but instead communicate via the Internet 10. Thus, the computer system 1 of the previous embodiment may be suitable for a large organization, as their size justifies them having their own central verification server 3. In contrast, the computer system 20 of the present embodiment may be suitable for smaller organizations whose size does not justify their having their own central verification server 3.

By having the client device 2 communicate with the central verification server 3 via the Internet 10, this allows the central verification server 3 to be used by client devices of multiple smaller organizations. For example, a central verification server 3 may be provided by the organization which provides Internet services to the smaller organizations (e.g. their Internet service provider (ISP)).

Figure 5:
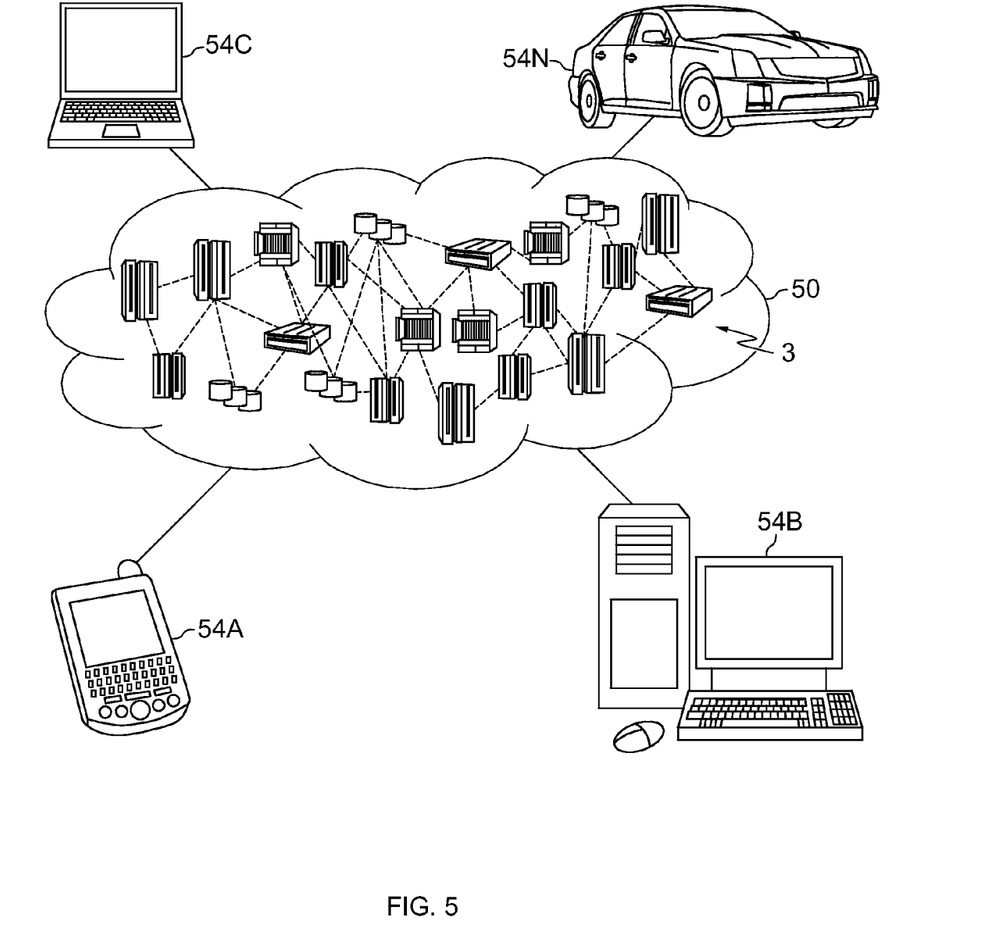
FIG. 5 is a schematic of a cloud computing environment, in accordance with an embodiment of the present invention.

Referring now to FIG. 5, illustrative cloud computing environment 50 is depicted. It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

As shown, cloud computing environment 50 comprises one or more cloud computing nodes (e.g. central verification server 3) with which local computing devices used by cloud consumers, such as, for example, personal digital assistant (PDA) or cellular telephone 54A, desktop computer 54B, laptop computer 54C, and/or automobile computer system 54N may communicate. The one or more cloud computing nodes may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that central verification server 3 and cloud computing environment 50 can communicate with any type of computerized device over any type of network and/or network addressable connection (e.g., using a web browser).

Figure 6:
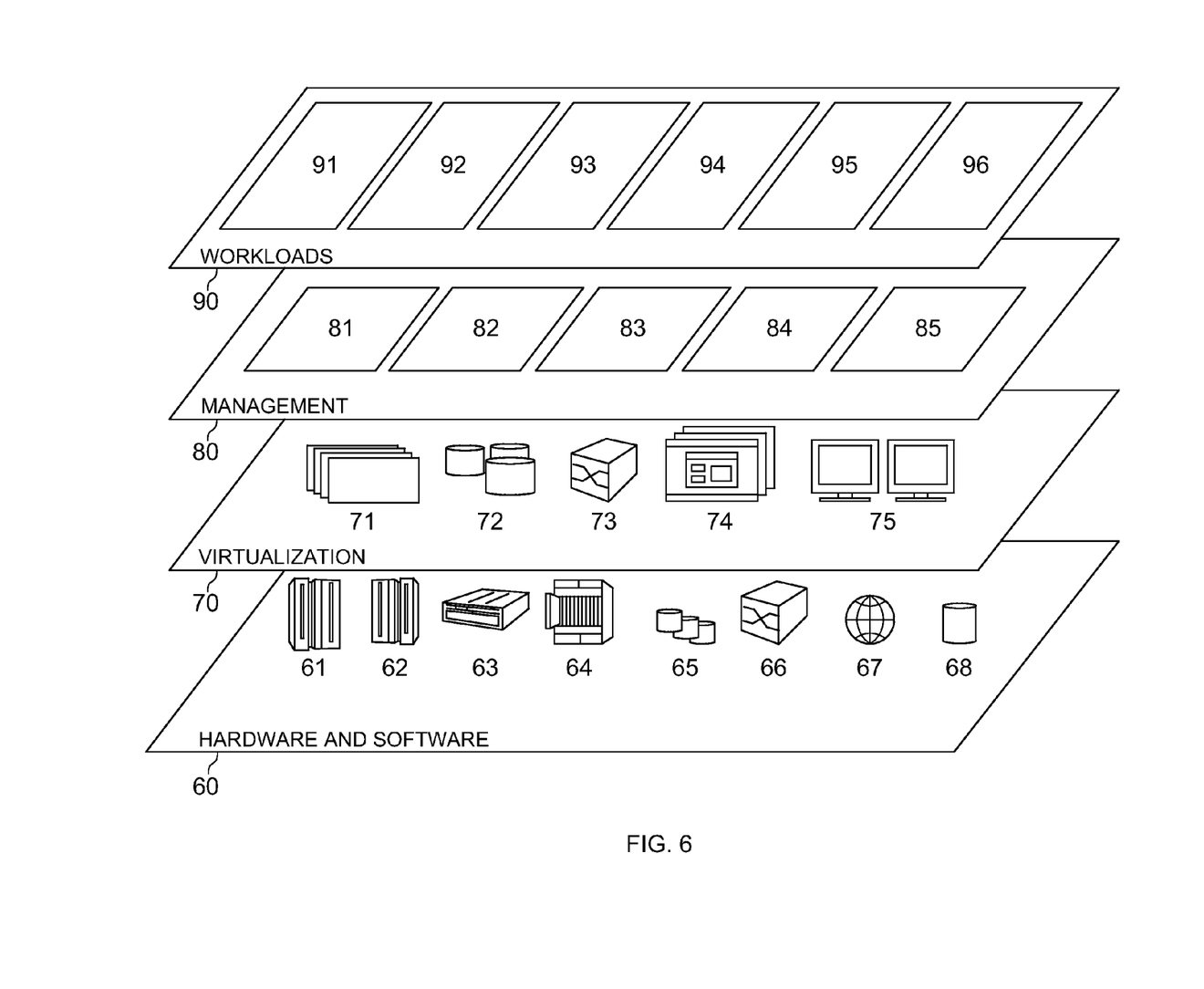
FIG. 6 is a set of functional abstraction layers provided by the cloud computing environment, in accordance with an embodiment of the present invention.

Referring now to FIG. 6, a set of functional abstraction layers provided by cloud computing environment 50 (FIG. 5) is shown. It should be understood that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determine trustworthiness of a cryptographic certificate 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer-implemented method of determining whether a cryptographic certificate can be trusted, comprising:
   receiving a pre-checked cryptographic certificate from a client device, wherein the pre-check comprises a first check on a first set of attributes of the cryptographic certificate, wherein the client device stores the cryptographic certificate on a client device memory, wherein the client device verifies the cryptographic certificate as a trusted certificate, and wherein the client device transmits the trusted certificate to a second device that performs a second check;
   performing the second check on a second set of attributes of the pre-checked cryptographic certificate, wherein the second device stores the pre-checked cryptographic certificate in an attribute store, wherein the second check comprises,
      analyzing historical certificate information to determine correlations between the pre-checked cryptographic certificate and the historical certificate information,
      performing a statistical analysis using the historical certificate information, wherein the statistical analysis determines a certificate score, and
      comparing the pre-checked certificate with a plurality of information stored on a certificate revocation list (CRL);
   determining that the pre-checked certificate passes the second check; and
   transmitting a notification to the client device.

2. The method of claim 1, further comprising:
   a central verification server performing one or more steps of the method.

3. The method of claim 1, further comprising:
   storing information obtained from the second check on the second set of attributes in a stored list of attributes.

4. The method of claim 3, wherein the second check is based in part on the stored list of attributes.

5. The method of claim 3, further comprising using the stored list of attributes to determine a correlation between one or more attributes in the second set of attributes.

6. The method of claim 3, wherein the second check includes identifying an anomaly in the second set of attributes.

7. The method of claim 6, wherein in response to the identified anomaly, generating a notification message.

8. The method of claim 1, wherein the second check includes checking if an attribute of the second set of attributes is in a stored list of attributes; and
   in response to determining that the attribute of the second set of attributes is in the stored list of attributes, the attribute of the second set of attributes passes the second check.

9. The method of claim 1, wherein the second check includes checking if an attribute of the second set of attributes is in a stored list of attributes; and
   in response to determining that the attribute of the second set of attributes is in the stored list of attributes, the attribute of the second set of attributes does not pass the second check.

10. A computer system for determining whether a cryptographic certificate can be trusted, comprising:
    one or more processors, one or more computer-readable memories, one or more computer-readable non-transitory storage medium, and program instructions stored on at least one of the one or more tangible storage medium for execution by at least one of the one or more processors via at least one of the one or more memories, wherein the computer system is capable of performing a method comprising:
    receiving a pre-checked cryptographic certificate from a client device, wherein the pre-check comprises a first check on a first set of attributes of the cryptographic certificate, wherein the client device stores the cryptographic certificate on a client device memory, wherein the client device verifies the cryptographic certificate as a trusted certificate, and wherein the client device transmits the trusted certificate to a second device that performs a second check;
    performing the second check on a second set of attributes of the pre-checked cryptographic certificate, wherein the second device stores the pre-checked cryptographic certificate in an attribute store, wherein the second check comprises,
       analyzing historical certificate information to determine correlations between the pre-checked cryptographic certificate and the historical certificate information,
       performing a statistical analysis using the historical certificate information, wherein the statistical analysis determines a certificate score, and
       comparing the pre-checked certificate with a plurality of information stored on a certificate revocation list (CRL);
    determining that the pre-checked certificate passes the second check; and
    transmitting a notification to the client device.

11. The computer system of claim 10, further comprising:
    a central verification server performing one or more steps of the method.

12. The computer system of claim 10, further comprising:
    storing information obtained from the second check on the second set of attributes in a stored list of attributes.

13. The computer system of claim 12, wherein the second check is based in part on the stored list of attributes.

14. The computer system of claim 12, further comprising using the stored list of attributes to determine a correlation between one or more attributes in the second set of attributes.

15. The computer system of claim 12, wherein the second check includes identifying an anomaly in the second set of attributes.

16. The computer system of claim 15, wherein in response to the identified anomaly, generating a notification message.

17. The computer system of claim 10, wherein the second check includes checking if an attribute of the second set of attributes is in a stored list of attributes; and in response to determining that the attribute of the second set of attributes is in the stored list of attributes, the attribute of the second set of attributes passes the second check.

18. The computer system of claim 10, wherein the second check includes checking if an attribute of the second set of attributes is in a stored list of attributes; and in response to determining that the attribute of the second set of attributes is in the stored list of attributes, the attribute of the second set of attributes does not pass the second check.

19. A computer program product for determining whether a cryptographic certificate can be trusted, comprising:

one or more computer-readable storage media and program instructions stored on at least one of the one or more non-transitory storage media, the program instructions executable by a processor to cause the processor to perform a method comprising:

receiving a pre-checked cryptographic certificate from a client device, wherein the pre-check comprises a first check on a first set of attributes of the cryptographic certificate, wherein the client device stores the cryptographic certificate on a client device memory, wherein the client device verifies the cryptographic certificate as a trusted certificate, and wherein the client device transmits the trusted certificate to a second device that performs a second check;

performing the second check on a second set of attributes of the pre-checked cryptographic certificate, wherein the second device stores the pre-checked cryptographic certificate in an attribute store, wherein the second check comprises, analyzing historical certificate information to determine correlations between the pre-checked cryptographic certificate and the historical certificate information, performing a statistical analysis using the historical certificate information, wherein the statistical analysis determines a certificate score, and comparing the pre-checked certificate with a plurality of information stored on a certificate revocation list (CRL);

determining that the pre-checked certificate passes the second check; and transmitting a notification to the client device.

20. The computer program product of claim 19, further comprising:

storing information obtained from the second check on the second set of attributes in a stored list of attributes.

21. The computer program product of claim 20, wherein the second check is based in part on the stored list of attributes.

22. The computer program product of claim 20, further comprising using the stored list of attributes to determine a correlation between one or more attributes in the second set of attributes.

23. The computer program product of claim 20, wherein the second check includes identifying an anomaly in the second set of attributes.

24. The computer program product of claim 23, wherein in response to the identified anomaly, generating a notification message.

25. The computer program product of claim 19, wherein the second check includes checking if an attribute of the second set of attributes is in a stored list of attributes; and in response to determining that the attribute of the second set of attributes is in the stored list of attributes, the attribute of the second set of attributes passes the second check.

* * * * *